US011442934B2

(12) United States Patent
Ludwig et al.

(10) Patent No.: US 11,442,934 B2
(45) Date of Patent: Sep. 13, 2022

(54) DATABASE CALCULATION ENGINE WITH DYNAMIC TOP OPERATOR

(71) Applicant: SAP SE, Walldorf (DE)

(72) Inventors: Michael Ludwig, Leimen (DE); Johannes Merx, Heidelberg (DE); Matthias Vigelius, Walldorf (DE); Christoph Weyerhaeuser, Leimen (DE)

(73) Assignee: SAP SE, Walldorf (DE)

( * ) Notice: Subject to any disclaimer, the term of this patent is extended or adjusted under 35 U.S.C. 154(b) by 28 days.

(21) Appl. No.: 16/833,318

(22) Filed: Mar. 27, 2020

(65) Prior Publication Data

US 2021/0303562 A1    Sep. 30, 2021

(51) Int. Cl.
*G06F 16/24* (2019.01)
*G06F 16/2453* (2019.01)
*G06F 16/22* (2019.01)

(52) U.S. Cl.
CPC ...... *G06F 16/2453* (2019.01); *G06F 16/2228* (2019.01); *G06F 16/2282* (2019.01)

(58) Field of Classification Search
CPC .................................................. G06F 16/2453
USPC ........................................................ 707/759
See application file for complete search history.

(56) References Cited

U.S. PATENT DOCUMENTS

| 6,985,904 | B1 * | 1/2006 | Kaluskar ........... G06F 16/24539 |
| 9,569,464 | B1 * | 2/2017 | Crow .................. G06F 16/2453 |
| 2018/0018375 | A1 * | 1/2018 | Brunel .............. G06F 16/24554 |
| 2020/0210423 | A1 * | 7/2020 | Feng .................. G06F 16/2282 |
| 2021/0081419 | A1 * | 3/2021 | Bellamkonda .... G06F 16/24537 |

* cited by examiner

*Primary Examiner* — Syling Yen
(74) *Attorney, Agent, or Firm* — Mintz Levin Cohn Ferris Glovsky and Popeo, P.C.

(57) ABSTRACT

A method, a system, and a computer program product for executing a query. A query associated with a calculation scenario defining a data flow model that includes one or more calculation nodes is received. Each calculation node corresponds to an operation being performed on one or more database tables stored at a database. The calculation nodes include one or more nodes specifying a window function operation. The window function operation including one or more first attributes and one or more second attributes. A calculation engine executes the calculation scenario by performing, using at least one of the first and second attributes, the window function operation on the database tables stored at the database. Based on the execution of the calculation scenario, a result data set is generated and provided by the database server to the application server.

20 Claims, 7 Drawing Sheets

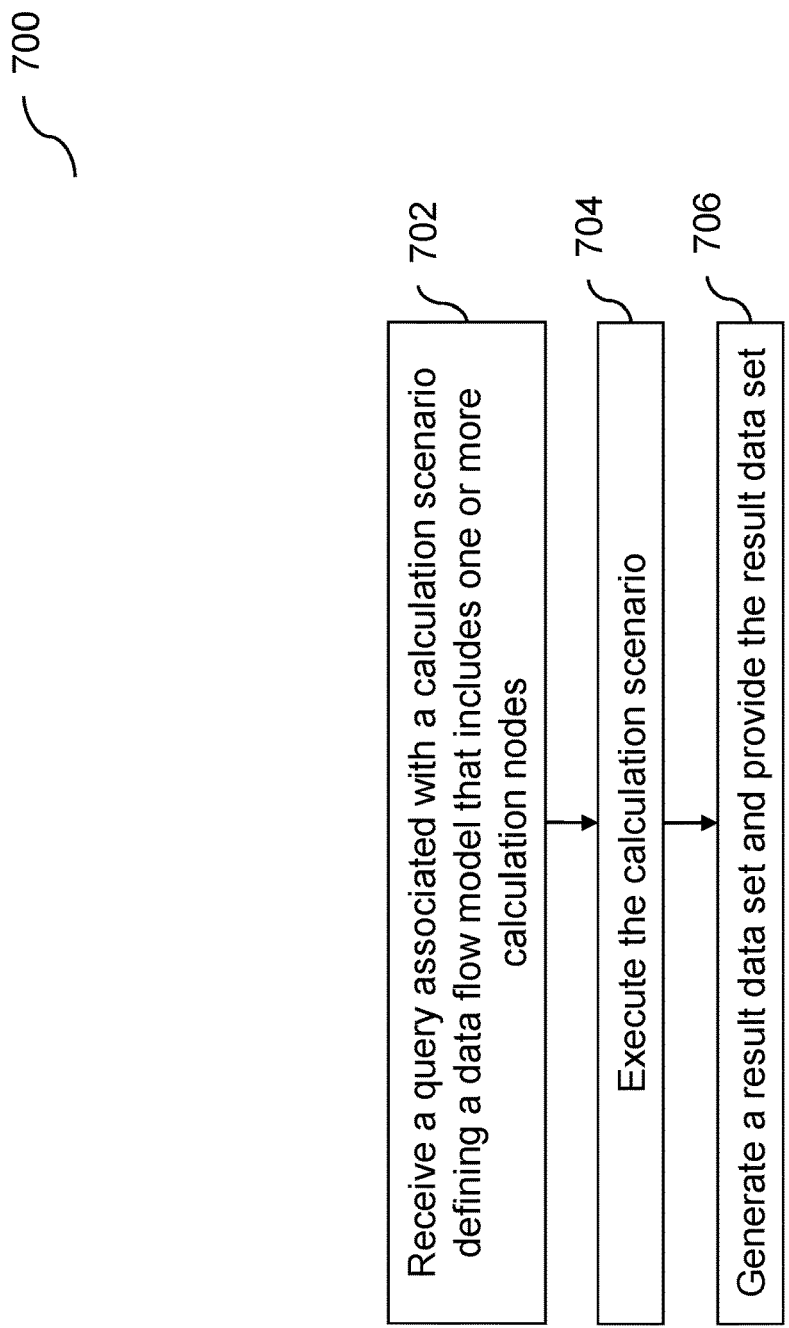

DATABASE CALCULATION ENGINE WITH DYNAMIC TOP OPERATOR

TECHNICAL FIELD

This disclosure relates generally to data processing and, in particular, to database calculation engines with dynamic top operators.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In some implementations, the current subject matter relates to a computer implemented method for executing a query. The method may include receiving, by a database server from an application server, a query associated with a calculation scenario defining a data flow model that includes one or more calculation nodes. Each calculation node may correspond to an operation being performed on one or more database tables stored at a database. The calculation nodes may include one or more nodes specifying a window function operation. The window function operation may include one or more first attributes and one or more second attributes. The method may further include executing, by a calculation engine, the calculation scenario. The execution may include, using at least one of the first and second attributes, performing the window function operation on the database tables stored at the database. The method may also include generating, based on the executing of the calculation scenario, a result data set and providing, by the database server to the application server, the result data set.

In some implementations, the current subject matter may include one or more of the following optional features. The one or more first attributes may be one or more partition attributes for partitioning the database tables stored at the database into one or more partitions. The one or more second attributes may be one or more ordering attribute for ordering rows of the one or more partitions. The method may further include dynamically removing, upon instantiation of the calculation scenario, at least one ordering attribute in the one or more ordering attributes.

In some implementations, the result data set may correspond to at least a portion of rows included in the one or more partitions of the one or more database tables stored at the database.

In some implementations, execution of the calculation scenario may include performing the window function operation to generate the result data set corresponding to at least a portion of rows included in the database tables stored at the database. In some implementations, the node may include a ranking filter operation.

In some implementations, the calculation engine may invoke an SQL processor for executing set operations. Further, an input for each calculation node may include one or more of: a physical index, a join index, an OLAP index, and another calculation node. Each calculation node may have at least one output table that is used to generate the data set. At least one calculation node may consume an output table of another calculation node. The database may be a column-oriented in-memory database.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 is an exemplary method, according to some implementations of the current subject matter.

DETAILED DESCRIPTION

To address these and potentially other deficiencies of currently available solutions, one or more implementations of the current subject matter relate to methods, systems, articles of manufacture, and the like that can, among other possible advantages, provide database calculation engines with dynamic top operators.

Data flow between an application server and a database server may be dependent on the scope and quantity of queries generated by the application server. Complex calculations may require executing numerous queries at the database server, which in turn may consume significant resources for transporting data to the application server and also processing the data at the application server. As such, in some example embodiments, a calculation engines may be deployed in order to perform complex calculations having numerous queries. For example, the calculation engine may be configured to execute calculation scenarios modeling complex queries. Instead of multiple individual queries, the calculation engine may execute a query invoking a calculation scenario. The calculation scenario may include a plurality of nodes, each of which corresponding to an operation performed on a database table. Moreover, the calculation scenario may be modeled in a generic manner including by exposing a selection of attributes that may be applied at each node in the calculation scenario. The query may thus invoke the calculation scenario by specifying one or more of the attributes.

Figure 1:
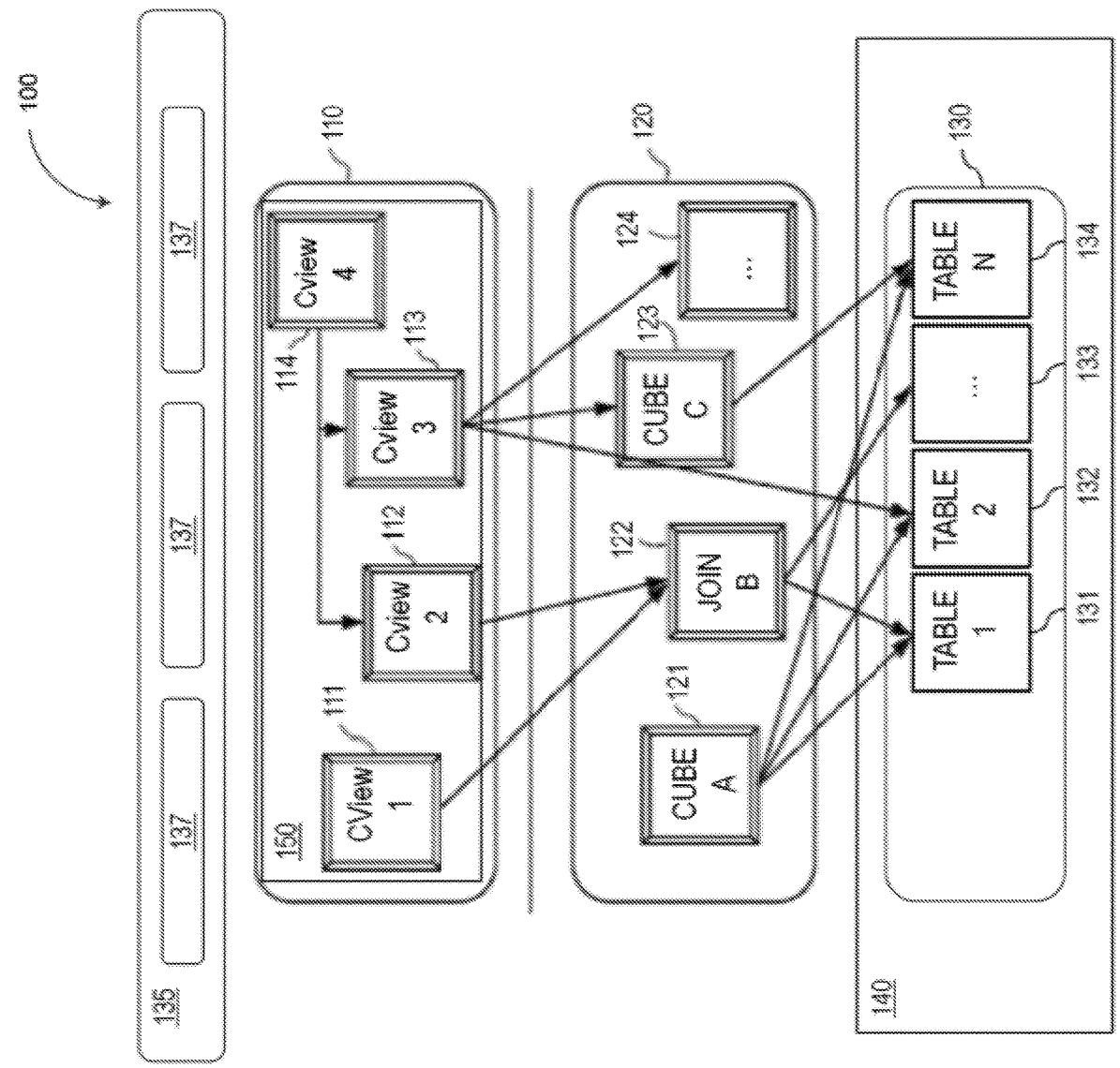
FIG. 1 illustrates an exemplary database system, according to some implementations of the current subject matter.

FIG. 1 illustrates an exemplary database system 100, according to some implementations of the current subject matter. The database system 100 may include one or more layers including, for example, a calculation engine layer 110, a logical layer 120, and a physical table-pool 130. One or more application servers 135 implementing database client applications 137 may access the database system 100. Calculation scenarios may be executed by a calculation engine, which may form part of a database or which may be part of the calculation engine layer 110 (which is associated with the database). The calculation engine layer 110 may be based on and/or interact with the other two layers, the logical layer 120 and/or the physical table pool 130. The basis of the physical table pool 130 may include physical tables (called indexes) containing the data, which may be stored on one more database servers 140. Various tables 131-134 may be joined using logical metamodels 121-124 defined by the logical layer 120 to form an index. For example, the tables 131-134 in the illustrated Cube$_A$ metamodel 121 (e.g., an online analytical processing or "OLAP" index or other type of data structure) may be assigned roles (e.g., fact or dimension tables) and be joined to form a star schema or other type of schema. It is also possible to form join indexes (e.g., the Join$_B$ metamodel 122 in FIG. 1), which may act like database views in computing environments.

A calculation scenario 150 may include individual nodes 111-114 (e.g., calculation views), which in turn each define operations such as a ranking filter operation, a join operation joining various physical or logical indexes, and other calculation views (e.g., the CView$_4$ node 114 is illustrated as a join of the CView$_2$ node 112 and the CView$_3$ node 113). That is, the input for a calculation node 111-114 may be one or more of a relational operation, a non-relational operation, or another node 111-114. Relational operations generally refer to operations that may be executed by a relational (e.g., SQL) engine. For example, joins, unions, aggregations, and/or the like are considered relational operations. On the other hand, non-relational operations may be operations that are not part of the standard relational engine's programming language (e.g., SQL standard) or may otherwise not be expressed in the programming language. For example, operations that may loop over intermediate results, scripted views/operators, procedural logic, currency conversion, multi-providers, and/or the like are considered non-relational operations.

In a calculation scenario 150 and/or calculation view node 111-114, two different representations may be provided including a pure calculation scenario in which all possible attributes are given and an instantiated model (also referred to herein as "optimized calculation scenario") that contains only the attributes requested in the query (and required for further calculations). Thus, calculation scenarios may be created that may be used for various queries. With such an arrangement, a calculation scenario 150 may be created which may be reused by multiple queries even if such queries do not require every attribute specified by the calculation scenario 150. Similarly, calculation views (e.g., nodes 111-114) may be created so that they may be reused in multiple calculation scenarios including, for example, the calculation scenario 150. This reusability may provide for simplified development of database queries.

Every calculation scenario 150 may be uniquely identifiable by a name (e.g., the calculation scenario 150 may be a database object with a unique identifier or some other indicia). Accordingly, the calculation scenario 150 may be queried in a manner similar to a view in a SQL database. Thus, the query is forwarded to the calculation node 111-114 for the calculation scenario 150 that is marked as the corresponding default node. In addition, a query may be executed on a particular calculation node 111-114 (as specified in the query). Further, nested calculation scenarios may be generated in which one calculation scenario 150 is used as source in another calculation scenario (e.g. via a calculation node 111-114 in this calculation scenario 150). Each calculation node 111-114 may have one or more output tables. One output table may be consumed by several calculation nodes 111-114.

Figure 2:
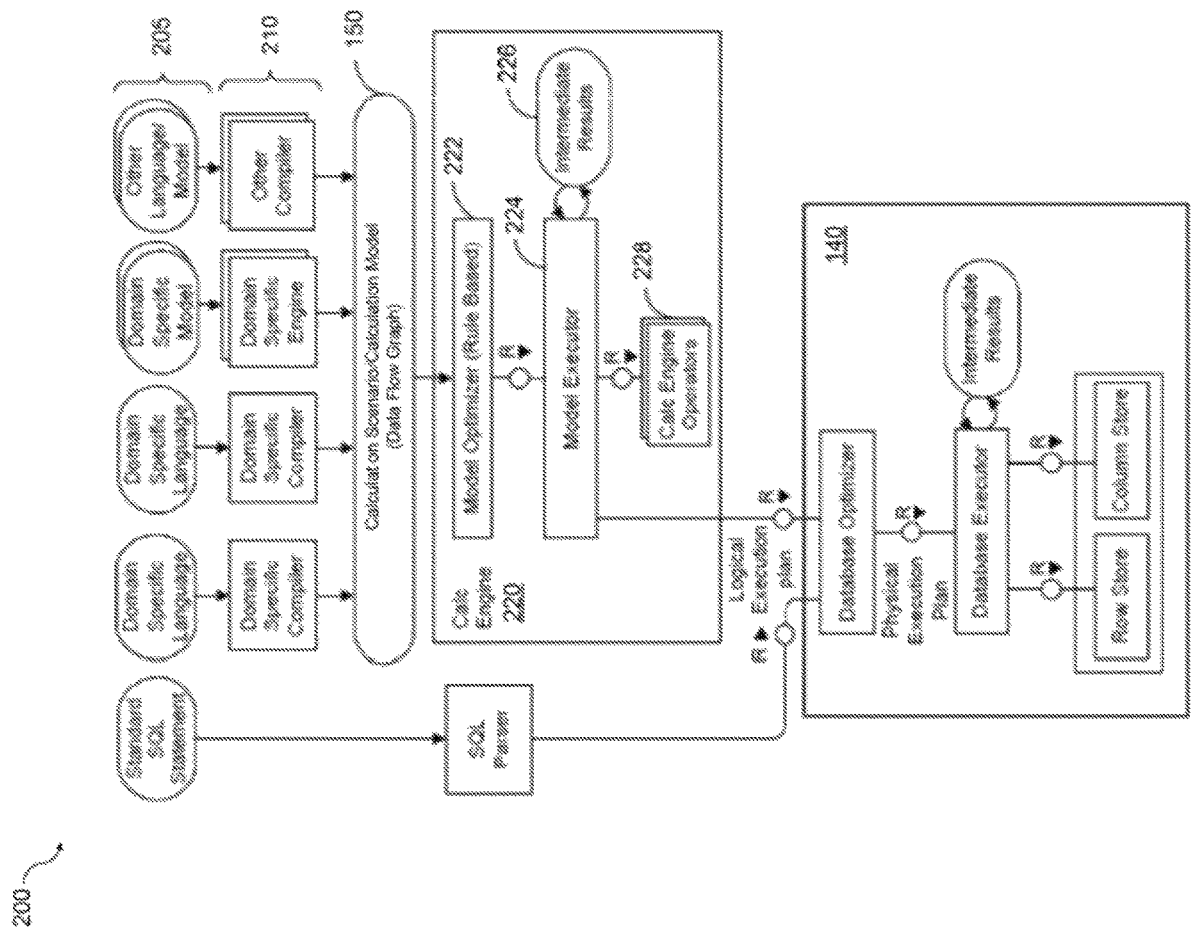
FIG. 2 illustrates an exemplary architecture for request processing and execution control, according to some implementations of the current subject matter.

FIG. 2 illustrates an exemplary architecture 200 for request processing and execution control, according to some implementations of the current subject matter. As shown in FIG. 2, artifacts 205 in different domain specific languages may be translated by their specific compilers 210 into a common representation called the calculation scenario 150 (which may also referred to as a calculation model). To achieve enhanced performance, the models and programs written in these languages may be executed inside the database server 140. This arrangement eliminates the need to transfer large amounts of data between the database server 140 and a client application 137, which may be executed by the application server 135. Once the different artifacts 205 are compiled into this calculation scenario 150, they may be processed and executed in the same manner. For example, a calculation engine 220 may optimize and/or execute the calculation scenario 150. At least a portion of the illustrated architecture 200 may be implemented as a database management system (e.g., not including the artifacts 205).

The calculation scenario 150 may be represented as a directed acyclic graph with arrows representing data flows and nodes that represent operations. Each node includes a set of inputs and outputs and an operation (or optionally multiple operations) that transforms the inputs into the outputs. In addition to their primary operation, each node may also include a filter condition for filtering the result set. The inputs and the outputs of the operations may be table valued parameters (i.e., user-defined table types that are passed into a procedure or function and that provide an efficient way to pass multiple rows of data to a client application 137 at the application server 135). Inputs may be connected to tables or to the outputs of other nodes. The calculation scenario 150 may support a variety of node types such as (i) nodes for set operations such as projection, aggregation, join, union, minus, intersection, and (ii) SQL nodes that execute a SQL statement which is an attribute of the calculation node. In addition, to enable parallel execution, the calculation scenario 150 may contain split and merge operations. A split operation may be used to partition input tables for subsequent processing steps based on partitioning criteria. Operations between the split and merge operation may then be executed in parallel for the different partitions. Parallel execution may also be performed without split and merge operation such that all nodes on one level may be executed in parallel until the next synchronization point. Split and merge allows for enhanced/automatically generated parallelization. If a user knows that the operations between the split and merge may work on portioned data without changing the result, they may use a split. Then, the calculation nodes may be automatically multiplied between split and merge and partition the data.

The calculation scenario 150 may be defined as part of database metadata and invoked multiple times. For example, the calculation scenario 150 may be created by a SQL statement "CREATE CALCULATION SCENARIO <NAME> USING <XML or JSON>". Once the calculation scenario 150 is created, it may be queried (e.g., "SELECT A, B, C FROM <scenario name>", etc.). In some cases, the calculation scenario 150 may be pre-defined (e.g., defaults, those previously defined by users, etc.). The predefined calculation scenario 150 may be persisted in a repository (coupled to the database server 140) or in transient scenarios. The predefined calculation scenario 150 may also be kept in-memory.

The calculation scenario 150 may be considered more powerful than traditional SQL queries or SQL views for many reasons. One reason is the possibility to define parameterized calculation schemas that are specialized when the actual query is issued. Unlike a SQL view, the calculation scenario 150 does not necessarily describe the actual query to be executed. Rather, it may describe the structure of the calculation. Further information may be supplied when the calculation scenario is executed. This further information may include parameters that represent values (for example in filter conditions). To provide additional flexibility, the operations may optionally also be refined upon invoking the calculation model. For example, at definition time, the calculation scenario 150 may contain an aggregation node containing all attributes. Later, the attributes for grouping may be supplied with the query. This allows having a predefined generic aggregation, with the actual aggregation dimensions supplied at invocation time. The calculation engine 220 may use the actual parameters, attribute list, grouping attributes, and the like supplied with the invocation to instantiate a query specific calculation scenario 150. This instantiated calculation scenario 150 is optimized for the actual query and does not contain attributes, nodes or data flows that are not needed for the specific invocation. For example, as described herein, the calculation scenario 150 may comprise a hierarchical join, which may be optimized by the calculation engine 220 prior to execution.

When the calculation engine 220 gets a request to execute the calculation scenario 150, it may first optimize the calculation scenario 150 using a rule based model optimizer 222. Examples for optimizations performed by the model optimizer 222 may include "push down" filters and projections so that intermediate results 226 are narrowed down earlier in compilation or execution, or the combination of multiple aggregation and join operations into one node. The optimized model may then be executed by a calculation engine model executor 224 (a similar or the same model executor may be used by the database directly in some cases). This may include decisions about parallel execution of operations in the calculation scenario 150. The model executor 224 may invoke the required operations (using, for example, a calculation engine operators module 228) and manage intermediate results 226. At least some of the calculation nodes and the corresponding operations may be executed directly in the calculation engine 220 (e.g., creating the union of several intermediate results 226). The remaining nodes of the calculation scenario 150 (not implemented in the calculation engine 220) may be transformed by the model executor 224 into a set of logical database execution plans. Multiple set operation nodes and the corresponding operations may be combined into one logical database execution plan if possible.

The model optimizer 222 may be configured to enable dynamic partitioning based on one or more aspects of a query and/or datasets used by queries. The model optimizer may implement a series of rules that are triggered based on attributes of incoming datasets exceeding specified thresholds. Such rules may, for example, apply thresholds each with a corresponding a parallelization factor. For example, if the incoming dataset has 1 million rows then two partitions (e.g., parallel jobs, etc.) may be implemented, or if the incoming dataset has five million rows then five partitions (e.g., parallel jobs, etc.) may be implemented, and the like. The attributes of the incoming datasets utilized by the rules of model optimizer 222 may additionally or alternatively be based on an estimated and/or actual amount of memory consumed by the dataset, a number of rows and/or columns in the dataset, and the number of cell values for the dataset, and the like.

The calculation scenario 150 may include a type of node referred to herein as a semantic node (or sometimes semantic root node). In some aspects, a database modeler may flag the root node (output) in a graphical calculation view to which the queries of the database applications are directed as semantic node. This arrangement allows the calculation engine 220 to easily identify those queries and to thereby provide a proper handling of the query in all cases.

The calculation scenario 150 used by the calculation engine 220 may be exposed as a special type of database view called a graphical calculation view. For example, relational (e.g., SQL) views may be stacked on top of the calculation scenario 150. Stacking in this manner may allow for a user to customize the front end of a program which utilizes the calculation scenario 150. A calculation view may be used in SQL queries and may be combined with tables and standard views using joins and sub queries. When such a query is executed, the database executor inside the SQL processor (not shown) needs to invoke the calculation engine 220 to execute the calculation scenario 150 behind the calculation view. In some implementations, the calculation engine 220 and the SQL processor are calling each other: on one hand the calculation engine 220 invokes the SQL processor for executing set operations and SQL nodes and, on the other hand, the SQL processor invokes the calculation engine 220 when executing SQL queries with calculation views.

In some implementations, a query may be received by a database server from a remote application server that is associated with a calculation scenario that defines a data flow model including one or more calculation nodes. The calculation nodes may include a top operator node that may specify a plurality of attributes. The query may also request a subset of the attributes specified by the top operator node, where the database server may instantiate an optimized calculation scenario which may request only the subset of attributes. The operations defined by the calculation nodes of the instantiated calculation scenario may be executed to generate a responsive data set that may be provided to the application server by the database server.

In some implementations, a top operator may be parameterized by setting a number of lines that should be returned and defining a number of base attributes with a sort direction. The sort may be performed and the number of defined lines may be returned. Further, a special top attribute may be defined to allow obtaining a top number of lines for each group for this attribute. In order to calculate the top operator, the base attributes may be static (e.g., similar to join attributes for a join operator). If a static top operator specifies two base attributes, they may be requested independently from the attributes that may be requested by the query.

Dynamic top operators may specify a superset of base attributes on the top operator and to flag the top operator node for dynamic behavior. This flag may be evaluated by the instantiation process of the calculation engine 220 (as shown in FIG. 2). The instantiation process may remove all base attributes on the top operator that are not requested by the query and dynamic top operator results may be generated. A top operator may act in a dynamic fashion if the query specifies same (e.g., via a flag, etc.). The flag may be evaluated in the instantiation process for the calculation scenario 150 (as shown in FIG. 1) and the dynamic operation may reduce the number of base attributes of the top operator. An error may be returned of no base attribute is requested in the end.

In some implementations, calculation engine 220 may include a top operation that may be defined, among other properties, by one or more partition attributes, where a top computation may be performed individually for each partition. The use usage of partition attributes may be dependent on attributes that may be requested in the query, which may affect results of the query while improving performance. In some implementations, a ranking filter operation may represent a generalization of the top operation in which arbitrary functions may be used in addition, or alternatively, to more general filters.

Figure 3:
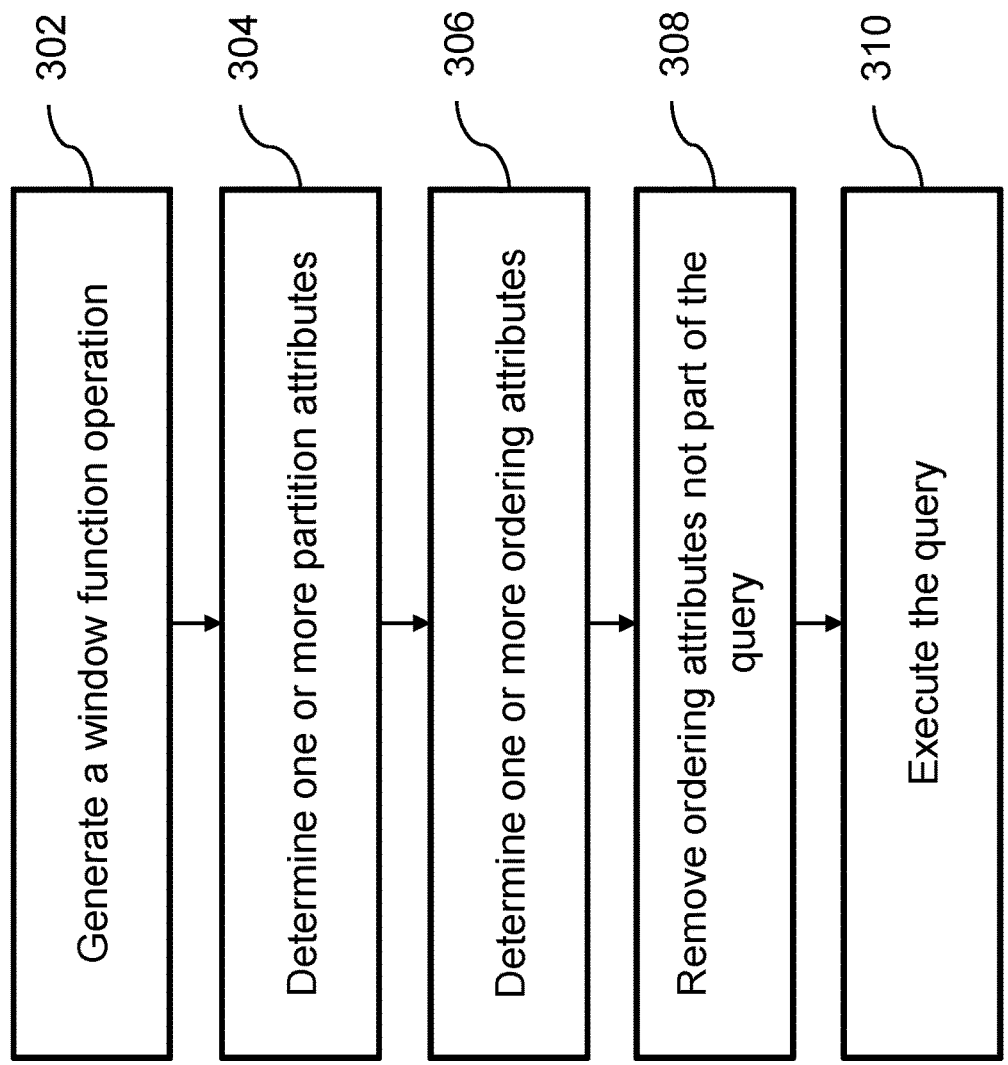
FIG. 3 illustrates an exemplary process for dynamically ordering attributes of a partition, according to some implementations of the current subject matter.

FIG. 3 illustrates an exemplary process 300 for executing a top operation, a window function operation, a ranking filter operation, and/or any other operation that may be part of a node, according to some implementations of the current subject matter. By way of a non-limiting example, the window function operation may provide native modeling capabilities for SQL window functions. An SQL window function may allow access to data that may be contained in the records right before and after a particular record. The window function may be configured to define a frame and/or window of rows with a specific length around the current row, and perform a calculation across a set of data in the window.

At 302, a window function operation may be generated. The window function operation may be defined by a user, a computing system, a software application, etc. The window function operation may be configured to have one or more properties (as may be defined by a user, a computing system, a software application, etc.), which may, for example, include partition attributes, ordering attributes, and/or any other properties. Other functions, e.g., top operation function, ranking filter function, etc. may also be defined in a similar fashion. The window function operation, the top operation function, and/or the ranking filter function may also be configured to share some of these properties. Moreover, the partition and/or ordering attributes may be used in a similar fashion by the above functions. The attributes, for example, may be configured to correspond to partition and ordering attributes from SQL window function(s). In some exemplary, non-limiting, implementations, the window function operation may be defined as follows:

<function_name>(<function_arguments>) OVER(PARTITION BY <attributes> ORDER BY <attributes> <frame_clause>)

The window function operation may be further defined through one or more function arguments as indicated by the brackets. In some implementations, the above window function may be used in combination with non-relational features of the calculation engine 220. In the window function operation, one or more features of the top operation may also be adopted. For example, the window function operation may be configured to adopt a feature of pushing down of filters that address database partition attributes, which may improve query execution performance without affecting the results.

In some implementations, the window function operation may also be configured to include a feature of dynamic ordering of partition attributes. In particular, the window function operation may be configured to include one or more partition attributes, that may be determined and/or defined as a result of receiving the query, at 304. The partition attributes may be configured to dynamically partition one or more database tables into one or more partitions.

At 306, one or more ordering attributes of the window function operation may also be determined and/or defined. The ordering attributes may be used to determine an order of rows in one or more partitions, where the partitions may be defined using one or more partition attributes, as identified at 304. As a result of determining of the ordering attributes, the upon instantiation of the calculation scenario 150, the ordering attributes that are not part of the query may be removed, at 308. This may be referred to as dynamic ordering. The query, using the "dynamically ordered" attributes, may be executed, at 310. Similar to dynamic partitioning, this may affect the generated result set while improving performance.

The following example illustrates the process 300. For the purposes of this example, it is assumed that the window function operation includes ROW_NUMBER operation, which has ordering attributes $O_1$ and $O_2$, as well as partition attributes $P_1$ and $P_2$, and that the following input table is used:

TABLE 1

| $O_1$ | $O_2$ | $P_1$ | $P_2$ |
|---|---|---|---|
| 1 | 2 | 3 | 4 |
| 2 | 1 | 3 | 5 |

Further, the calculation scenario, in this example, is configured to have dynamic partitioning and dynamic ordering. Upon instantiation, a ROW_NUM column may be added to the resulting table. The following tables illustrate results for requesting different sets of attributes. If all attributes are requested in the query, the following table may be generated:

TABLE 2

| ROW_NUM | $O_1$ | $O_2$ | $P_1$ | $P_2$ |
|---|---|---|---|---|
| 1 | 1 | 2 | 3 | 4 |
| 1 | 2 | 1 | 3 | 5 |

When all attributes are requested, the added ROW_NUM column may be configured to include rows with 1 entered into each row, because in Table 1, there are two partitions and both rows are the first (and only) rows within their respective partition.

If attributes $O_1$, $O_2$, $P_1$ are requested, the ROW_NUM column may be configured to include values 1 and 2, as illustrated in Table 3 below:

TABLE 3

| ROW_NUM | $O_1$ | $O_2$ | $P_1$ | $P_2$ |
|---|---|---|---|---|
| 1 | 1 | 2 | 3 | 4 |
| 2 | 2 | 1 | 3 | 5 |

If $O_2$ is requested, the ROW_NUM column may be configured to include values 2 and 1, as shown in Table 4 below:

TABLE 4

| ROW_NUM | $O_1$ | $O_2$ | $P_1$ | $P_2$ |
|---|---|---|---|---|
| 2 | 1 | 2 | 3 | 4 |
| 1 | 2 | 1 | 3 | 5 |

In some exemplary, non-limiting implementations, the executed operation at a node may include a ranking filter operation, which may be configured to implement dynamic ordering and/or dynamic partitioning processes discussed above. The ranking filter operation may be executed by the calculation engine 220, as part of the execution of a query that invokes the calculation scenario 150. This operation may be executed on a partition of a database table such as, for example, one or more of the tables 131-134 included in the physical table pool 130 shown in FIG. 1. The ranking filter operation may be an aggregation operation and a filter operation that the calculation engine 220 performs together, for example, one after another. The ranking filter operation may be performed to generate a result corresponding to at least a portion of the rows included the partition.

In some implementations, the result of the ranking filter operation may correspond to at least some of the rows included in the partition of the database table that have one or more attributes including, for example, a row number, a rank, and/or the like. For example, the ranking filter operation may be configured to generate a result including a top n quantity or a top n percentage of rows from the partition. That is, the result of the ranking filter may include rows whose row number does not exceed the value n or are in the top n percent of row numbers. Alternatively and/or additionally, the result of the ranking filter operation may include rows from the partition having a top n rank or a top n percentage rank. The result of the ranking filter operation may also include an aggregate (e.g., a sum, an average, a minimum, a maximum, a medium, a count, a mode, a range, and/or the like) of the values occupying a top n quantity or a top n percentage of rows from the partition.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 4:
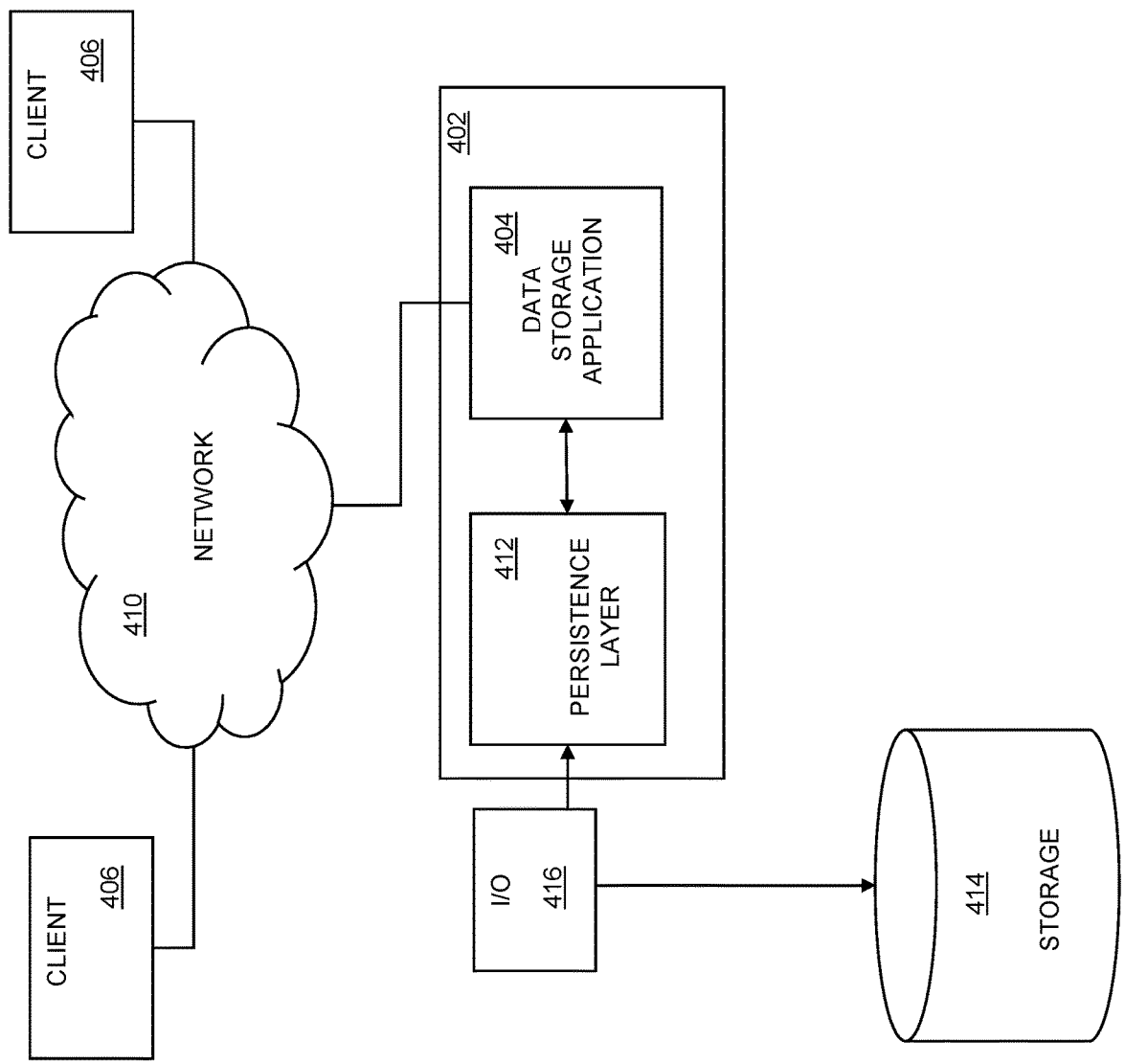
FIG. 4 is a diagram illustrating an exemplary system including a data storage application, according to some implementations of the current subject matter.

FIG. 4 illustrates an exemplary system 400 in which a computing system 402, which may include one or more programmable processors that may be collocated, linked over one or more networks, etc., executes one or more modules, software components, or the like of a data storage application 404, according to some implementations of the current subject matter. The data storage application 404 may include one or more of a database, an enterprise resource program, a distributed storage system (e.g. NetApp Filer available from NetApp of Sunnyvale, Calif.), or the like.

The one or more modules, software components, or the like may be accessible to local users of the computing system 402 as well as to remote users accessing the computing system 402 from one or more client machines 406 over a network connection 410. One or more user interface screens produced by the one or more first modules may be displayed to a user, either via a local display or via a display associated with one of the client machines 406. Data units of the data storage application 404 may be transiently stored in a persistence layer 412 (e.g., a page buffer or other type of temporary persistency layer), which may write the data, in the form of storage pages, to one or more storages 414, for example via an input/output component 416. The one or more storages 414 may include one or more physical storage media or devices (e.g. hard disk drives, persistent flash memory, random access memory, optical media, magnetic media, and the like) configured for writing data for longer term storage. It should be noted that the storage 414 and the input/output component 416 may be included in the computing system 402 despite their being shown as external to the computing system 402 in FIG. 4.

Data retained at the longer term storage 414 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 5:
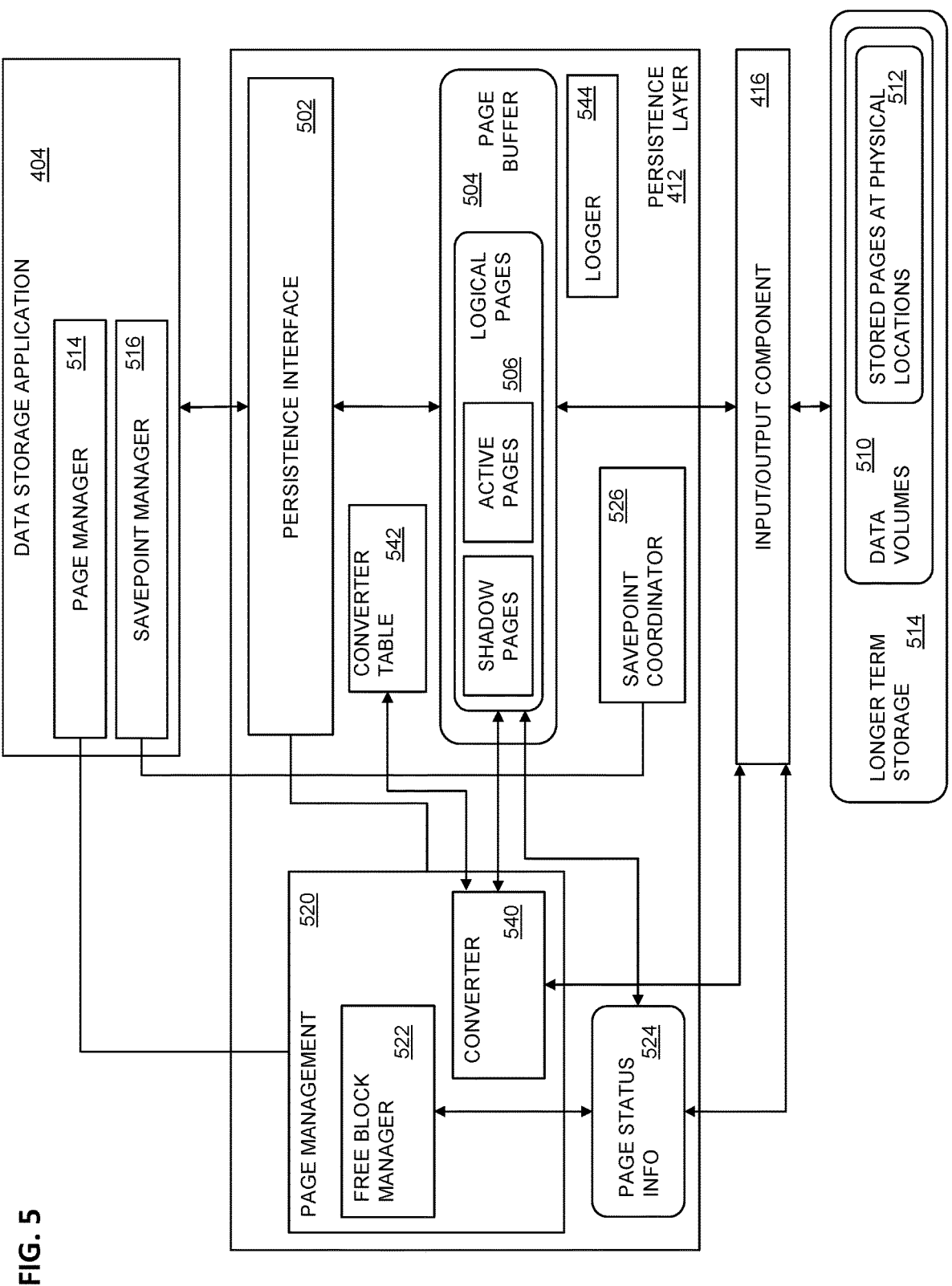
FIG. 5 is a diagram illustrating details of the system of FIG. 4.

FIG. 5 illustrates exemplary software architecture 500, according to some implementations of the current subject matter. A data storage application 404, which may be implemented in one or more of hardware and software, may include one or more of a database application, a network-attached storage system, or the like. According to at least some implementations of the current subject matter, such a data storage application 404 may include or otherwise interface with a persistence layer 412 or other type of memory buffer, for example via a persistence interface 502. A page buffer 504 within the persistence layer 412 may store one or more logical pages 506, and optionally may include shadow pages, active pages, and the like. The logical pages 506 retained in the persistence layer 412 may be written to a storage (e.g. a longer term storage, etc.) 414 via an input/output component 416, which may be a software module, a sub-system implemented in one or more of software and hardware, or the like. The storage 414 may include one or more data volumes 510 where stored pages 512 are allocated at physical memory blocks.

In some implementations, the data storage application 404 may include or be otherwise in communication with a page manager 514 and/or a savepoint manager 516. The page manager 514 may communicate with a page management module 520 at the persistence layer 412 that may include a free block manager 522 that monitors page status information 524, for example the status of physical pages within the storage 414 and logical pages in the persistence layer 412 (and optionally in the page buffer 504). The savepoint manager 516 may communicate with a savepoint coordinator 526 at the persistence layer 412 to handle savepoints, which are used to create a consistent persistent state of the database for restart after a possible crash.

In some implementations of a data storage application 404, the page management module of the persistence layer 412 may implement a shadow paging. The free block manager 522 within the page management module 520 may maintain the status of physical pages. The page buffer 504 may include a fixed page status buffer that operates as discussed herein. A converter component 540, which may be part of or in communication with the page management module 520, may be responsible for mapping between logical and physical pages written to the storage 414. The converter 540 may maintain the current mapping of logical pages to the corresponding physical pages in a converter table 542. The converter 540 may maintain a current mapping of logical pages 506 to the corresponding physical pages in one or more converter tables 542. When a logical page 506 is read from storage 414, the storage page to be loaded may be looked up from the one or more converter tables 542 using the converter 540. When a logical page is written to storage 414 the first time after a savepoint, a new free physical page is assigned to the logical page. The free block manager 522 marks the new physical page as "used" and the new mapping is stored in the one or more converter tables 542.

The persistence layer 412 may ensure that changes made in the data storage application 404 are durable and that the data storage application 404 may be restored to a most recent committed state after a restart. Writing data to the storage 414 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 544 may also be included to store the changes made to the data of the data storage application in a linear log. The logger component 544 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 544 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 412 may use a combination of undo log entries (from one or more logs) and shadow paging.

The persistence interface 502 may handle read and write requests of stores (e.g., in-memory stores, etc.). The persistence interface 502 may also provide write methods for writing data both with logging and without logging. If the logged write operations are used, the persistence interface 502 invokes the logger 544. In addition, the logger 544 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 544. For an entry of type "update", for example, this would be the identification of the affected record and the after image of the modified data.

When the data application 404 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 544 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 544 may write a database log (or simply referred to herein as a "log") sequentially into a memory buffer in natural order (e.g., sequential order, etc.). If several physical hard disks/storage devices are used to store log data, several log partitions may be defined. Thereafter, the logger 544 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 404 may use shadow paging so that the savepoint manager 516 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 6:
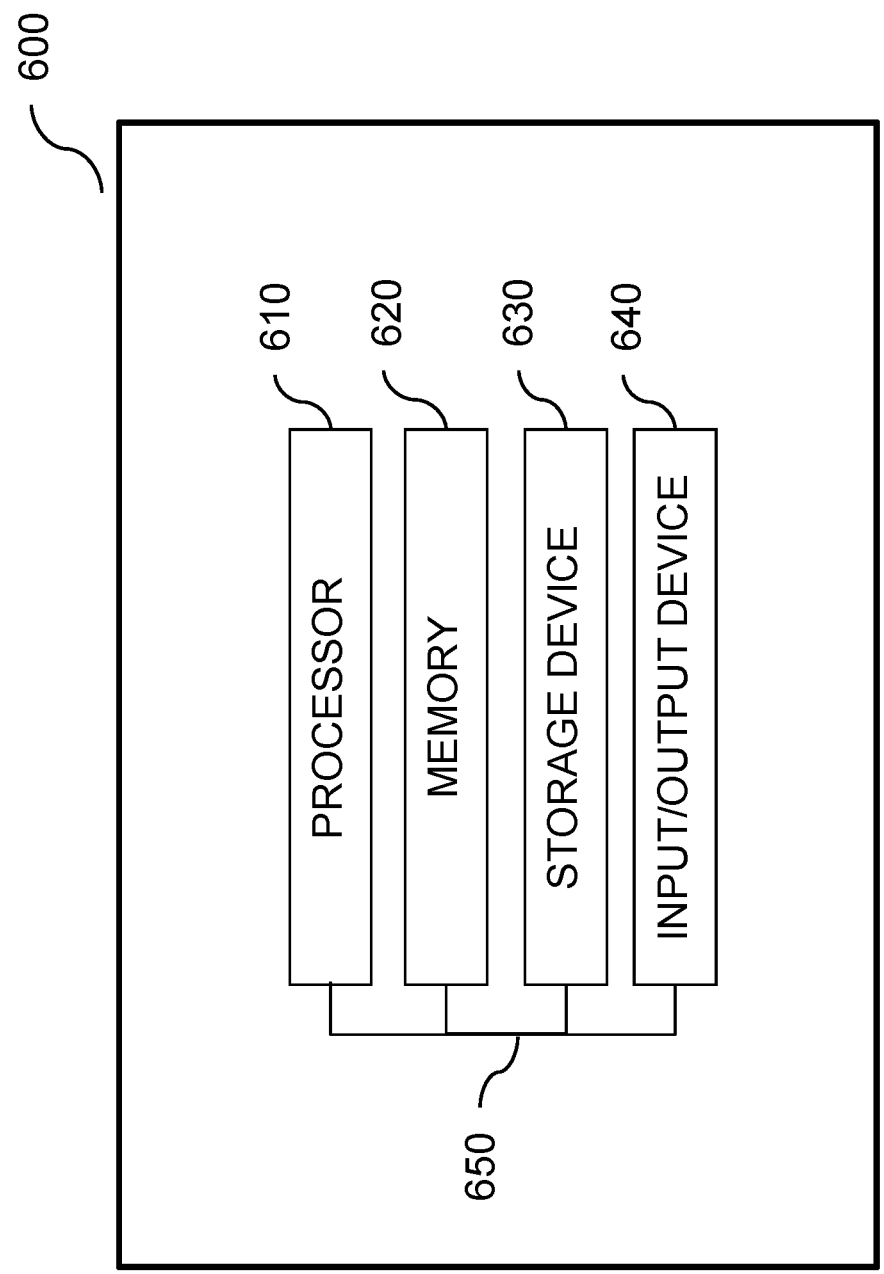
FIG. 6 is an exemplary system, according to some implementations of the current subject matter.

In some implementations, the current subject matter may be configured to be implemented in a system 600, as shown in FIG. 6. The system 600 may include a processor 610, a memory 620, a storage device 630, and an input/output device 640. Each of the components 610, 620, 630 and 640 may be interconnected using a system bus 650. The processor 610 may be configured to process instructions for execution within the system 600. In some implementations, the processor 610 may be a single-threaded processor. In alternate implementations, the processor 610 may be a multi-threaded processor. The processor 610 may be further configured to process instructions stored in the memory 620 or on the storage device 630, including receiving or sending information through the input/output device 640. The memory 620 may store information within the system 600. In some implementations, the memory 620 may be a computer-readable medium. In alternate implementations, the memory 620 may be a volatile memory unit. In yet some implementations, the memory 620 may be a non-volatile memory unit. The storage device 630 may be capable of providing mass storage for the system 600. In some implementations, the storage device 630 may be a computer-readable medium. In alternate implementations, the storage device 630 may be a floppy disk device, a hard disk device, an optical disk device, a tape device, non-volatile solid state memory, or any other type of storage device. The input/output device 640 may be configured to provide input/output operations for the system 600. In some implementations, the input/output device 640 may include a keyboard and/or pointing device. In alternate implementations, the input/output device 640 may include a display unit for displaying graphical user interfaces.

FIG. 7 illustrates an exemplary method 700 for executing a query, according to some implementations of the current subject matter. At 702, a database server (e.g., a database server 140) may be configured to receive a query from an application server (e.g., application server 135). The query may be associated with a calculation scenario (e.g., calculation scenario 150) that may define a data flow model that may include one or more calculation nodes. Each calculation node may be configured to correspond to an operation being performed on one or more database tables stored at a database. The calculation nodes may include a node specifying a window function operation (e.g., as discussed above in connection with FIG. 3). The window function operation may include one or more first attributes and one or more second attributes.

At 704, the calculation engine (e.g., calculation engine 220) may be configured to execute the calculation scenario. The execution of the calculation scenario may include performing the window function operation on the database tables stored at the database using at least one of the first and second attributes.

At 706, based on the executing of the calculation scenario, a result data set may be generated. The result data set may also be provided by the database server to the application server.

In some implementations, the current subject matter may include one or more of the following optional features. The one or more first attributes may be one or more partition attributes for partitioning the database tables stored at the database into one or more partitions. The one or more second attributes may be one or more ordering attribute for ordering rows of the one or more partitions. The method may further include dynamically removing, upon instantiation of the calculation scenario, at least one ordering attribute in the one or more ordering attributes.

In some implementations, the result data set may correspond to at least a portion of rows included in the one or more partitions of the one or more database tables stored at the database.

In some implementations, execution of the calculation scenario may include performing the window function operation to generate the result data set corresponding to at least a portion of rows included in the database tables stored at the database. In some implementations, the node may include a ranking filter operation.

In some implementations, the calculation engine may invoke an SQL processor for executing set operations. Further, an input for each calculation node may include one or more of: a physical index, a join index, an OLAP index, and another calculation node. Each calculation node may have at least one output table that is used to generate the data set. At least one calculation node may consume an output table of another calculation node. The database may be a column-oriented in-memory database.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    receiving, by a database server from an application server, a query associated with a reusable calculation scenario defining a data flow model that includes one or more calculation nodes, each one or more calculation nodes corresponding to an operation being performed on one or more database tables stored at a database, the one or more calculation nodes including one or more nodes specifying a window function operation, the window function operation including one or more first attributes and one or more second attributes, wherein a portion of the calculation scenario not forming part of the received query being removed during instantiation of the calculation scenario;
    executing, by a calculation engine, the calculation scenario, the executing including, using at least one of the first and second attributes, performing the window function operation on the one or more database tables stored at the database, at least one first calculation node in the one or more calculation nodes is executed by the calculation engine, and at least one second calculation node in the one or more calculation nodes is transformed into a set of logical database execution plans having a combination of a plurality of calculation nodes and corresponding operations, wherein each of the first and second attributes being associated with a corresponding rule configured to be triggered upon attributes exceeding a corresponding predetermined threshold, at least one rule being generated based on a determination of at least one of an estimated and an actual amount of memory consumed by a dataset associated with at least one of the first and second attributes; and
    generating, based on the executing of the calculation scenario, a result data set and providing, by the database server to the application server, the result data set.

2. The method according to claim 1, wherein the one or more first attributes are one or more partition attributes for partitioning the one or more database tables stored at the database into one or more partitions.

3. The method according to claim 2, wherein the one or more second attributes are one or more ordering attributes for ordering rows of the one or more partitions.

4. The method according to claim 3, further comprising, upon instantiation of the calculation scenario, dynamically removing at least one ordering attribute in the one or more ordering attributes.

5. The method according to claim 1, wherein the result data set corresponds to at least a portion of rows included in the one or more partitions of the one or more database tables stored at the database.

6. The method according to claim 1, wherein the executing of the calculation scenario includes performing the window function operation to generate the result data set corresponding to at least a portion of rows included in the one or more database tables stored at the database.

7. The method according to claim 1, wherein the node specifies a ranking filter operation.

8. The method according to claim 1, wherein the calculation engine invokes an SQL processor for executing set operations.

9. The method according to claim 1, wherein an input for each calculation node comprises one or more of: a physical index, a join index, an OLAP index, and another calculation node.

10. The method according to claim 9, wherein each calculation node has at least one output table that is used to generate the data set.

11. The method according to claim 10, wherein at least one calculation node consumes an output table of another calculation node.

12. The method according to claim 1, wherein the database is a column-oriented in-memory database.

13. A system comprising:
at least one programmable processor; and
a non-transitory machine-readable medium storing instructions that, when executed by the at least one programmable processor, cause the at least one programmable processor to perform operations comprising:
receiving, by a database server from an application server, a query associated with a reusable calculation scenario defining a data flow model that includes one or more calculation nodes, each one or more calculation nodes corresponding to an operation being performed on one or more database tables stored at a database, the one or more calculation nodes including one or more nodes specifying a window function operation, the window function operation including one or more first attributes and one or more second attributes, wherein a portion of the calculation scenario not forming part of the received query being removed during instantiation of the calculation scenario;
executing, by a calculation engine, the calculation scenario, the executing including, using at least one of the first and second attributes, performing the window function operation on the one or more database tables stored at the database, at least one first calculation node in the one or more calculation nodes is executed by the calculation engine, and at least one second calculation node in the one or more calculation nodes is transformed into a set of logical database execution plans having a combination of a plurality of calculation nodes and corresponding operations, wherein each of the first and second attributes being associated with a corresponding rule configured to be triggered upon attributes exceeding a corresponding predetermined threshold, at least one rule being generated based on a determination of at least one of an estimated and an actual amount of memory consumed by a dataset associated with at least one of the first and second attributes; and
generating, based on the executing of the calculation scenario, a result data set and providing, by the database server to the application server, the result data set.

14. The system according to claim 13, wherein the one or more first attributes are one or more partition attributes for partitioning the one or more database tables stored at the database into one or more partitions.

15. The system according to claim 14, wherein the one or more second attributes are one or more ordering attributes for ordering rows of the one or more partitions.

16. The system according to claim 15, wherein the operations further comprise, upon instantiation of the calculation scenario, dynamically removing at least one ordering attribute in the one or more ordering attributes.

17. The system according to claim 13, wherein the result data set corresponds to at least a portion of rows included in the one or more partitions of the one or more database tables stored at the database.

18. The system according to claim 13, wherein the executing of the calculation scenario includes performing the window function operation to generate the result data set corresponding to at least a portion of rows included in the one or more database tables stored at the database.

19. The system according to claim 13, wherein the node specifies a ranking filter operation.

20. A computer program product comprising a non-transitory machine-readable medium storing instructions that, when executed by at least one programmable processor, cause the at least one programmable processor to perform operations comprising:
receiving, by a database server from an application server, a query associated with a reusable calculation scenario defining a data flow model that includes one or more calculation nodes, each one or more calculation nodes corresponding to an operation being performed on one or more database tables stored at a database, the one or more calculation nodes including one or more nodes specifying a window function operation, the window function operation including one or more first attributes and one or more second attributes, wherein a portion of the calculation scenario not forming part of the received query being removed during instantiation of the calculation scenario;
executing, by a calculation engine, the calculation scenario, the executing including, using at least one of the first and second attributes, performing the window function operation on the one or more database tables stored at the database, at least one first calculation node in the one or more calculation nodes is executed by the calculation engine, and at least one second calculation node in the one or more calculation nodes is transformed into a set of logical database execution plans having a combination of a plurality of calculation nodes and corresponding operations, wherein each of the first and second attributes being associated with a corresponding rule configured to be triggered upon attributes exceeding a corresponding predetermined threshold, at least one rule being generated based on a determination of at least one of an estimated and an actual amount of memory consumed by a dataset associated with at least one of the first and second attributes; and
generating, based on the executing of the calculation scenario, a result data set and providing, by the database server to the application server, the result data set.

* * * * *